(12) United States Patent
Chinesta et al.

(10) Patent No.: US 9,817,374 B2
(45) Date of Patent: Nov. 14, 2017

(54) METHOD AND DEVICE FOR THE REAL-TIME SIMULATION OF COMPLEX SYSTEMS AND PROCESSES

(71) Applicants: ECOLE CENTRALE DE NANTES, Nantes (FR); CENTRE NATIONAL DE LA RECHERCHE SCIENTIFIQUE, Paris (FR)

(72) Inventors: Francisco Chinesta, Orvault (FR); Adrien Leygue, Nantes (FR); Felipe Bordeu, Nantes (FR); Arnaud Poitou, Port Saint Pere (FR)

(73) Assignees: ECOLE CENTRALE DE NANTES, Nantes (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 625 days.

(21) Appl. No.: 14/355,171

(22) PCT Filed: Nov. 6, 2012

(86) PCT No.: PCT/EP2012/071953
§ 371 (c)(1),
(2) Date: May 22, 2014

(87) PCT Pub. No.: WO2013/064704
PCT Pub. Date: May 10, 2013

(65) Prior Publication Data
US 2014/0257527 A1    Sep. 11, 2014

(30) Foreign Application Priority Data
Nov. 1, 2011 (FR) .................................. 11 59885

(51) Int. Cl.
G05B 13/04 (2006.01)
G06F 17/13 (2006.01)
(Continued)

(52) U.S. Cl.
CPC .............. *G05B 13/04* (2013.01); *G05B 17/02* (2013.01); *G06F 17/13* (2013.01); *G06F 17/17* (2013.01)

(58) Field of Classification Search
CPC ......... G05B 13/04; G05B 17/02; G06F 17/13; G06F 17/17
See application file for complete search history.

(56) References Cited

U.S. PATENT DOCUMENTS 6,429,846 B2 * 8/2002 Rosenberg .............. A63F 13/06
                                                    345/156
8,325,144 B1 * 12/2012 Tierling .................. G06F 3/016
                                                    345/156
(Continued)

OTHER PUBLICATIONS

Anthony Nouy (A priori model reduction through Proper Generalized Decomposition for solving time-dependent partial differential equations, Computer Methods in Applied Mechanics and Engineering 199, Available online Jan. 28, 2010, pp. 1603-1626).*

(Continued)

*Primary Examiner* — Sean Shechtman
*Assistant Examiner* — Michael W Choi
(74) *Attorney, Agent, or Firm* — Im IP Law; C. Andrew Im

(57) ABSTRACT

A method for a real-time dynamic simulation of a response of a complex system or process controlled by a plurality of driving factors $P_i$ (i=1 ... k), each varying in a given range of variation. The range of variation of the driving factor $P_i$ is discretized into $NP_i$ values. A prior parametric model of simulation is obtained in the form of a functional equation connecting the response to variations in the plurality of driving factors for any combination of values of the driving factors. Their range of variation is in the form of a sum of N modes that are functions of the factors. Each mode is defined for each of the NPi discretized values. The para- (Continued)

metric model is stored in the form of a computer program in an independent device comprising a processor capable of running the program.

8 Claims, 3 Drawing Sheets

(51) Int. Cl.
*G06F 17/17* (2006.01)
*G05B 17/02* (2006.01)

(56) References Cited

U.S. PATENT DOCUMENTS

| | | | | |
|---|---|---|---|---|
| 2004/0020356 A1* | 2/2004 | Ojanen | ............... | G05B 17/02 91/361 |
| 2005/0107895 A1* | 5/2005 | Pistikopoulos | ........ | G05B 17/02 700/52 |
| 2005/0248549 A1* | 11/2005 | Dietz | ............... | G06F 3/016 345/179 |
| 2007/0057913 A1* | 3/2007 | Eid | ............... | G06F 3/016 345/156 |
| 2008/0010038 A1* | 1/2008 | Smaragdis | ........... | G06K 9/6226 702/181 |
| 2010/0178644 A1* | 7/2010 | Meglan | ............... | G06F 19/3437 434/267 |
| 2010/0318336 A1* | 12/2010 | Falangas | ............. | G06F 17/5095 703/8 |

OTHER PUBLICATIONS

Francisco Chinesta et al., "A short review on model order reduction based on proper generalized decomposition", Archives of Computational Methods in Engineering, Springer Netherlands, vol. 18, No. 4, Oct. 11, 2011, pp. 395-404.

A. Ammar et al., "Solving parametric complex fluids models in rheometric flows", Journal of Non-Newtonian Fluid Mechanics, vol. 165, No. 23-24, Dec. 1, 2010, pp. 1588-1601.

David Gonzalez et al., "Recent advances on the use of separated representations", International Journal for Numerical Methods in Engineering, vol. 81, No. 5, Jan. 1, 2009, pp. 1-24.

\* cited by examiner

METHOD AND DEVICE FOR THE REAL-TIME SIMULATION OF COMPLEX SYSTEMS AND PROCESSES

RELATED APPLICATIONS

This application is a §371 application from PCT/EP2012/071953 filed Nov. 6, 2012, which claims priority from French Patent Application No. 11 59885 filed Nov. 1, 2011, each of which is herein incorporated by reference in its entirety.

TECHNICAL FIELD OF THE INVENTION

The invention relates to a method and a device for the real-time simulation of a complex system or process. A complex system or process means the simulation of physical and chemical phenomena of any type, interacting mechanical or biological systems or social processes in which changes are governed by a large number of variables based on laws that may be non-linear. The needs for simulating such processes are numerous and relate to different issues including, without limitation, optimization and prediction, for example for the purpose of decision making, or the dynamic control of systems. In this respect, the term simulation means quantitatively defining a response of such a system or process, which response is expressed by the value or the rate of change of one or more parameters, depending on a defined level or a variation with a defined and quantitative amplitude of identified controlled or uncontrolled driving factors. The invention is intended for the simulation of systems or processes where the behavior of said systems or processes can be connected to the values or value variations of the driving factors by laws that can be stated in mathematical form, whether those laws are empirical or the result of fundamental principles.

BACKGROUND OF THE INVENTION

The simulation devices and methods are known in the prior art and widely used, and take advantage of the ever increasing power of computers. FIG. 1 is an illustration of a case of complex simulation. In that example, an operator (100) manipulates a stylus (110), which is connected to an articulated mechanical assembly (115) capable of producing forces that oppose the movement of said stylus. The operator moves the stylus by viewing its movement on an image displayed by a screen (120). The image represents a deformable solid (130) of any shape, which can be defined by its shape, dimensions, and the material or materials of which it is made. The articulated device (115) and the display of the image on the screen (120) are managed by a computer (150) that computes a model representing a solid (130) and providing the response of that solid, in the form of components of a force that reacts to a movement imposed at a given point. Because the properties of the solid (130) are known, it is possible to compute its response to a movement of the stylus, measured by the articulated system (115) and in return, to control the actuators of said articulated system (115) so that they apply against that movement a force with a given intensity and spatial direction, in proportion with the computed response of the solid (130). The result of the computation also makes it possible to view the computed deformation of the solid on the screen (120). Such a device is known as a haptic interface. According to the prior art, the mechanical response of the solid (130) to the application of a movement or a force with a given intensity and direction at any point of its surface can be computed by techniques using finite elements. The time for resolving each case of loading depends on the computing power that can be mobilized by the computer (150). For such an application, which is within the scope of augmented virtual reality, if the operator is to experience sensations comparable to actual interaction with the solid, the display must be updated at least 24 times every second, and regarding the resistance force, in order to reproduce the feeling of touch, the control of the actuators of the articulated mechanical assembly (115) must be updated several hundred times every second. Even in a simple case like this one, the computation speed required is to date out of the reach of computers or would require the use of computing means out of proportion with the sought objective. The problem of the computing power is even more acute when said computing means (150) must be of the on-board type, for instance on board a vehicle. Thus, one solution of the prior art for such a problem consists in computing beforehand or in offline mode a discrete solution with a sufficient density of points, which solution is then saved in the form of tables that are merely read back during real-time simulation. However, while such a solution makes it possible to achieve the required execution speeds with limited computing power, it is limited by the quantity of information to save. Thus, in this exemplary embodiment, if the surface of the solid (130) is discretized into Ns points, firstly, one needs to compute the intensity of the force (F) defined by a vector F and its three spatial components Fx, Fy and Fz, opposing an imposed movement (D), also defined by a vector D (140) and its spatial components Dx, Dy and Dz, regardless of the point of application (131) of the imposed movement from the Ns points, for the haptic interface.

Besides, for the visual interface, the movement of each of the Ns points of the solid must be computed; such movement is defined for each of the Ns points by a vector U and its three spatial components Ux, Uy and Uz, which vector must be defined regardless of the point of application (131) of the imposed movement (140) and regardless of the movement D imposed at that point.

In the prior art, the studied range of variation of the imposed movement is discretized into $n_d$ possibilities, where each component Dx, Dy and Dz can have $n_d$ values out of the Nd possibilities, so that $Nd = n_d \cdot n_d \cdot n_d = n_d^3$.

Thus, according to the prior art, computation is carried out by a computation code using for example the finite-element method, for all the possible combinations, and the corresponding results are stored in a table. Thus, to obtain the table, Nd×Ns simulations must be carried out. In one exemplary embodiment, if Nd=$10^6$, or 100 discretizing points per component, and Ns=100, then $10^8$ simulations will be necessary. At the rate of 0.1 seconds per simulation, which can only be reached if the computation power is particularly high, nearly 12 days will be needed to carry out the computations required and close to a year if each simulation takes three seconds.

Then, to store all the solutions in a table, 3×Nd×Ns×Ns results will have to be stored regarding the movement U of each of the Ns points of the surface of the solid to cover each case of loading, and 3×Nd×Ns results for the components of the force and for all cases of loading. Thus, if Nd=$10^6$ and Ns=100, the quantity of information to save is $3 \cdot (10^{10} + 10^8)$, or 30.3 gigabytes if each result is coded in 8 bits. Further, if finer resolution is required for the movement, so as to allow more frequent updating of the haptic interface, the quantity of data to save increases exponentially and the limits for storage are soon reached, particularly in on-board systems.

Hereinafter, "real-time" relates to a computation time below 0.04 seconds between two states of the simulated system or process, and "complex" applies to systems or processes where the simulated operating range can cover at least $10^6$ distinct states.

Another solution of the prior art consists in using an extremely simplified representation that only creates an illusion of actual behavior. Such solutions are commonly used in video games, but are too far removed from reality for use that requires a certain standard of safety such as the driving of vehicles or processes.

The examples of application above and the field of application of the method according to the invention are within the field of methods and devices known as DDDAS, standing for Dynamic Data Driven Applications Systems, which allow the real-time control of a simulation, for example through data from sensors, and in return, the ability to drive the system or process generating the data from updated simulation results. Such applications are currently limited by the "curse of dimensionality" as described above.

OBJECT AND SUMMARY OF THE INVENTION

The invention aims to remedy the drawbacks of the prior art and to that end relates to a method for the real-time control of a driving factor of a complex system or process the status of which is governed by a plurality of driving factors, Pi (i=1 . . . k), varying in discretized domains with NPi values, which process comprises the steps of:
u. obtaining a parametric model of simulation in the form of a functional equation connecting the response to variations in the plurality of driving factors for any combination of values of said factors in their range of variation in the form of a sum of N modes, that are functions of the factors, where each mode is defined for each of the NPi discretized values;
v. obtaining the instantaneous values of the plurality of driving factors of the system or process;
w. running the computer program representing the parametric model and determining the value of a response parameter depending on the instantaneous values of the driving factors;
x. modifying the status of the system or process (539) by modifying the value of a driving factor on the basis of the value of the computed response parameter.

Thus, the method according to the invention makes it possible to carry out a complex simulation by containing the curse of dimensionality through variable separation, by reducing that simulation to the determination of N modes, calculated beforehand (offline). Thus, the amount of information to store for the complete model is $N \times \Sigma NP_i$. In relation to the prior art, savings are made both in the cost of early (offline) resolution and in the cost of storage. The solution is expressed in the form of a sum of functions, and can be stored in small computation and storage means, and computed virtually instantly on such means. Thus, the method according to the invention makes it possible to both put the computation power offline for computing an accurate simulation of the behavior of the complex process or system and also to implement the solution accurately in a cost-effective manner. As a result, the solution can be duplicated in an infinity of independent computation means that do not need to be connected to additional computation means. Thus, the near instantaneous computation of the status of the system or process by means of the parametric model, through the direct provision of driving factor values with no need to search operating points in a table and carry out linear approximations, makes it possible to allow the adaptive control of the system or process using an independent computer with reduced computing power.

To that end, the invention also relates to a device for the implementation of such a method, wherein said device comprises:
i. memory means capable of storing a parametric model comprising N modes defined in all the NPi discretizing values of the driving factors;
ii. a processor capable of implementing the computations relating to said parametric model;
iii. an input port capable of receiving the numeric values associated with the plurality of driving factors Pi and means to scan those values;
iv. an output port capable of supplying proportional numeric information at the output during the implementation of the parametric model by the processor.

Such a device makes it possible to simulate complex systems and processes in real time with reduced computation power, dimensions and power consumption. Thus, the implementation of the method according to the invention in such a device makes it possible, for equivalent functional performance, to miniaturize the device in proportions reaching several orders of magnitude by comparison with devices of the prior art, such miniaturization being particularly advantageous in systems on board vehicles where mass is a primordial criterion and where control or the methods implemented by said vehicle make it necessary to use simulations of complex processes or systems.

The invention can be implemented in the advantageous embodiments described below, which can be considered individually or in any technically operative combination.

Advantageously, the parametric model is obtained by a method known as the PGD method, standing for Proper Generalized Decomposition. This method makes it possible to identify said parametric model from a sum of separate functions that are unknown on an a priori basis and supplemented by an iterative method. This method of resolution makes it possible to obtain an optimum compromise between the number of separate functions and the accuracy of the parametric model.

In one particular embodiment, N is greater than or equal to 10, each $NP_i$ is greater than or equal to 10 and k is greater than or equal to 80. A problem of such a dimension is strictly impossible to address with the techniques of the prior art and would make it necessary to store at least $10^{80}$ operating points, whereas it only requires the storage of at least 800 terms with the method according to the invention.

Advantageously, N ranges between 10 and 200. The larger the number N of modes, the more accurate the model, but also the more complex.

According to an advantageous embodiment of the method according to the invention, the value of a driving factor Pj is indeterminate and the method comprises the steps of:
ui. during step (u), building the parametric model integrating the driving factor Pj for a variation range discretized into NPj values;
uii. readjusting the parametric model for the effective value of the factor Pj.

Thus, the same program can be written for a whole family of similar systems or processes that are particularized for each particular case. Readjustment may be carried out on the basis of measurements or testing or from a database corresponding to predefined cases.

In an advantageous embodiment, one of the driving factors is a measurand with a value determined by a sensor.

Thus, the method according to the invention may be used to control a process or a system in response to its environment.

Advantageously, the output parameter is a non-measurable status variable of the process or system. Thus, the method according to the invention may be used to control the process or system in relation to an output which cannot be determined by a sensor, both during operation or by empiricism.

Advantageously, the method according to the invention comprises between steps (w) and (x) a step of:
y. displaying the computed parameter This embodiment is particularly advantageous in the area of virtual reality applications.

In one particular embodiment of the method according to the invention, the parameter computed in step (w) is used as the driving factor in steps (w) to (x) of a method according to one of the previous embodiments. Thus, by cascading one or more processes of this type in parallel, it becomes possible to drive very complex systems or processes with on-board computation means.

Advantageously, the device according to the invention comprises:
v. display means connected to the output port to visually represent the system or process;
vi. pointing means connected to the input port to generate the values of a driving factor.

Thus, the device according to the invention is suitable for use in virtual reality.

Advantageously, the device according to the invention comprises a haptic interface connected to the input port and output port.

In a particularly advantageous embodiment, the display and pointing means comprise a touch screen of a mobile terminal capable of operating independently, wherein the memory means and the processor are included in said mobile terminal. Thus, the simulation and control method according to the invention can be implemented on mobile devices such as smart phones, tablet PCs, or calculators.

In a particular embodiment, the haptic interface according to the invention simulates the movement of a surgical instrument in an organ. Thus, such a device may be used for training a surgeon in carrying out surgical procedures in tissues showing complex behavior in real time.

Advantageously, the simulated organ comprises tissue types with different behaviors, and said behaviors can be configured by the particularization driving factors Pj. Thus the same general model, computed once and for all, can be used to train a surgeon in different cases, possibly with increasing difficulty.

BRIEF DESCRIPTION OF THE DRAWINGS

The invention is described below in its preferred embodiments, which are not limitative in any way, and by reference to FIGS. 1 to 5, wherein.

in FIG. 3.

DETAILED DESCRIPTION OF THE EMBODIMENTS

Figure 1:
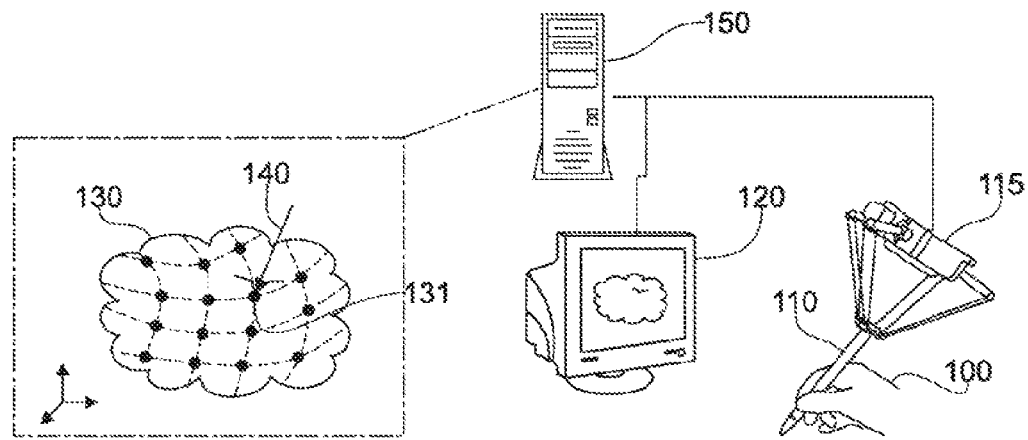
FIG. 1 is an example of a complex process implemented in virtual reality with a haptic interface.

In addition to the example of a haptic interface shown in FIG. 1, the method and device according to the invention may be used to control complex systems or processes, for example, to adapt their behavior to local and temporary phenomena that cannot be detected directly in real time by sensors, for reasons such as:
the device or the monitored area are not accessible;
there is no sensor capable of taking the measurements required;
the volume to control is too large, for example, the fuselage of an aircraft or the hull of a ship.

Returning to the example of the haptic interface in FIG. 1, the driving factors are the imposed displacement vector D (140), the vector application point (131). The range of variation of these driving factors is discretized into Nd values for the imposed movement and into Ns values, corresponding to the Ns discretizing points of the surface of the solid (130), for the point of application of the force. The parametric model used by the invention will express each of the three components of the movement U in each of the Ns points in 3×N modes of space defined in Ns points, N modes that are functions of the imposed movement defined for Nd vectors and N fmodes that are functions of the point of application defined in Ns points. Thus, the amount of information to store is 3×N(Ns+Nd+Ns) Consequently, if N=100, Ns=100 and Nd=$10^6$ then the quantity of information to store is $3 \cdot (10^8 + 2.10^4)$ or a mere hundredth of what is needed in the prior art, with more accurate results. In addition, if discretization is refined, the amount of information to be stored and computed increases linearly and not exponentially.

Figure 2:
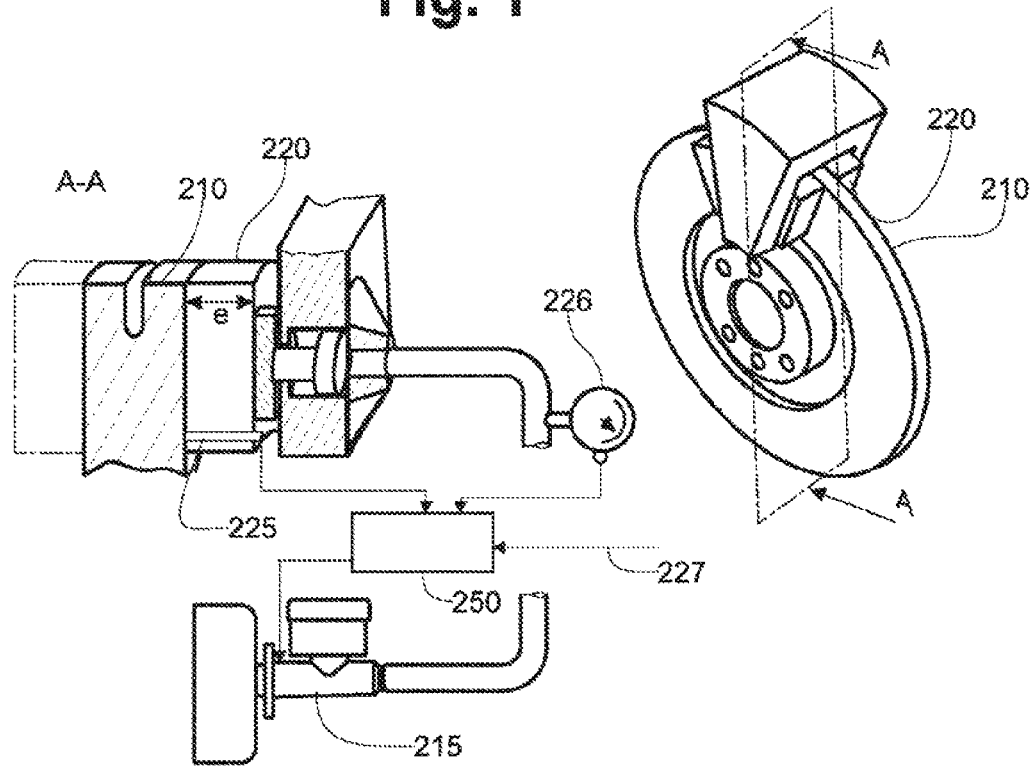
FIG. 2 is a perspective side view along the section A-A defined in the same figure of an example of disk braking device controlled by a method and a device according to an embodiment of the invention.

One non-limitative example of application is shown in FIG. 2, for the control of the thermal response of a braking device. Such a device implements moving solids such as the brake disk (210) and the linings (220), which can have complex shapes, such as those due to the presence of ventilation arrangements, grooves or bores, which shapes change over time (wear and tear). These solids are in interaction with fluids, such as the surrounding air and the hydraulic fluid controlling the braking. The interactions are mechanical and thermal, and take place at high speeds. In such a system, only overall factors can be measured, for example, the clamping pressure (226) of the linings on the disk, the disk speed and possibly the temperature (225) at some points of the linings. This information makes it possible to assess the macroscopic flow of mechanical energy converted into heat and removed essentially by the brake disk, and also to the linings and the hydraulic liquid. But the performance of such a device in the boundary conditions of stability and durability is governed by local and temporary phenomena. Thus, during the braking process, the elements in contact are subjected to high temperatures that alter their physical properties, particularly the friction coefficient at the interface between the linings (220) and the moving part (210), which accelerate the degradation of both the linings and the moving part. For example, an increase in the temperature at the interface between the disk and the linings can lead to a drop in the friction coefficient at that interface, which drop considerably reduces braking efficiency. The components of the braking system that are thus overheated transmit their heat to the other components of the system, particularly to the hydraulic fluid that could then locally start boiling and cause vapor locks in the hydraulic braking circuit.

Finally, the sudden and repeated overheating of the surface of the linings (220) and the surface of the braking tracks of the disk (210), creates thermal stresses through the differential expansion between a surface layer and the remainder of the volume of the linings (220) or the moving part (210). These thermal constraints lead to cracking, commonly referred to as "crazing", which speeds up the degradation of the linings and the disk. That crazing phenomenon is typically governed by the intensity of the temperature gradient in the thickness of the disk and the linings. Thus, the thermodynamic conditions at the origin of this type of degradation cannot be determined by an overall or local measurement from a sensor (225) or even a thermal image of the surface of the disk.

In the prior art, these phenomena are avoided by oversizing the braking system so that all the components of the system remain in acceptable conditions regardless of the braking conditions. That solution is disadvantageous in terms of mass, especially for vehicles, such as in aviation, which need to have highly efficient braking. Applied to this example, the method according to the invention makes it possible to compute, in real time, using an on-board computer (250), the temperature distribution in the volume of the disk, the linings and the hydraulic fluid, and to readjust the computation from measurands derived from mechanical sensors (226) or thermal sensors (225).

In order to obtain that information by computation, it is necessary to resolve the heat equation in each system component. A general formulation of the heat equation is, for example, given by the law known as Fourier's law in the form of a differential equation:

$$\rho(T) \cdot Cp(T) \cdot \frac{\partial T}{\partial t} + div(\lambda(T)grad(T)) = \sum P(x, t)$$

Where $\rho(T)$ is the density of the material constituting the component stated as a function of the temperature, $Cp(T)$ is the heating capacity of the same material, $\lambda(T)$ is its thermal conductivity, T is the temperature and t is the time. $\ni P(x,t)$ is the sum of the thermal power values of the different sources of heating, as well as dissipation by convection and radiation. To detect the phenomena mentioned above, it is indispensable to solve the equation for each component without neglecting any term, particularly the term relating to the spatial distribution of temperature:

$$div(\lambda(T) \cdot grad(T)).$$

Thus the solution of this equation depends on the geometry of each component.

A method is known in the prior art to solve this problem, particularly using the finite-element method based on a variational approach of Fourier's law using a Galerkin method. But that computation method requires resources and computation power that cannot be installed in an on-board computer (250). Moreover, even assuming that such computing power can be made available, the model must be rebuilt for each geometry of the disk or lining or generally for each change in properties of a component taken into account in said model.

The method according to the invention is based on a method consisting in representing the solution of the problem as a sum of functions with separate variables, or modes, in the form:

$$u(x1, \ldots xk) \approx \sum_{i=1}^{N} F_i^1(x1) \times \ldots \times F_i^k(xk)$$

where x1 . . . xk are generalized coordinates, that is to say spatial coordinates related to each of the components present in the system, time, or specific coordinates such as the temperature supplied by a thermocouple (225) inserted in the lining, the thickness (e) of the linings (220), the pressure (226) of the hydraulic liquid etc. These generalized coordinates represent driving factors of the system or process. The technique known as PGD, which stands for "Proper Generalized Decomposition" or generalized proper mode decomposition, makes it possible to find such a solution. This method is described for example in: "*Recent advances in the use of separated representations*", International Journal For Numerical Methods in Engineering, 81(5), pages 637-659, 2010, and is not described in further detail.

The PGD method makes it possible to determine the N functional products, each involving k functions that are unknown on an a priori basis. The model is built by successive supplementation, during which each functional product is determined sequentially. In a particular supplementation step i of the rank n+1, the functions:

$$F_i^j(x_j)$$

are known for i≤n of the previous supplementation steps and the new functional product involving k functions:

$$F_{n+1}^j(x_j)$$

is calculated. That computation is carried out by invoking a weak formulation of the problem. The resulting discrete system is non-linear, which implies that the iterative computation must be carried out at each supplementation step.

The resolution is carried out offline and leads to the identification of the N modes, which can then be easily implemented in a computer (250). The computation of those N modes, even if N>100 is fast, even with relatively low power computers.

Figure 3:
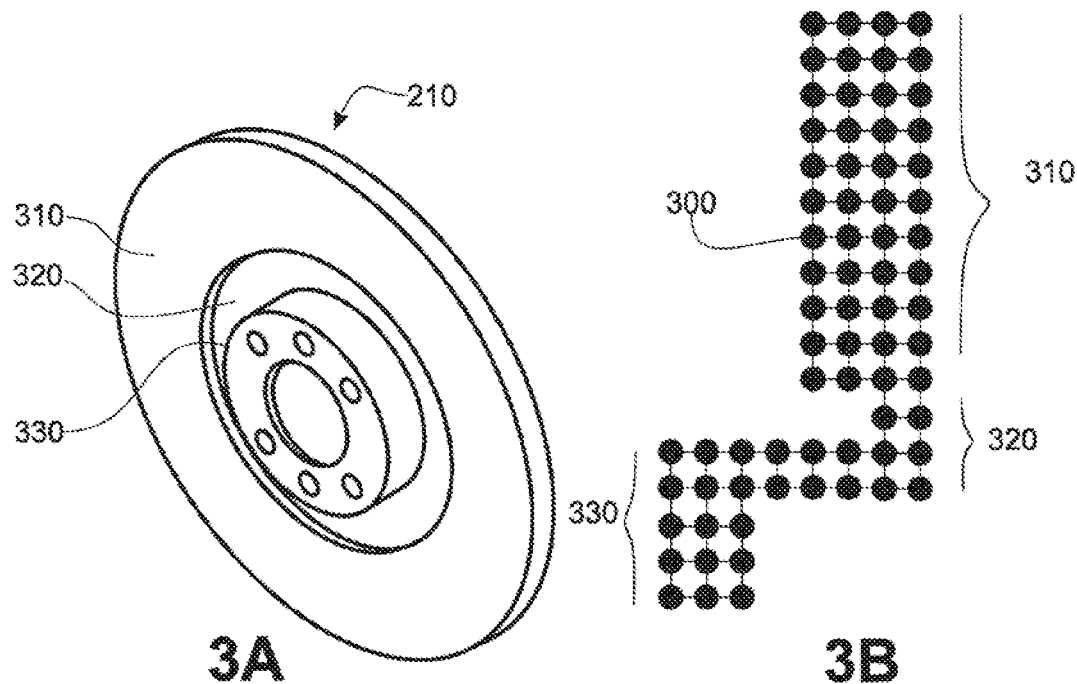
FIG. 3B is a side view of an example of the meshing of the brake disk in FIG. 2 shown in perspective in FIG. 3A.

In FIG. 3 of an exemplary embodiment, the temperature distribution in the disk (210) can be determined from a mesh in the thickness of the braking track (310), the hub (330) and the connecting area (320) between the two. Such a mesh comprises M nodes (300).

Said PGD method makes it possible to bring the problem to a number N×(M+ΣNPi) per output parameter, where NPi is the number of discretization points of each driving factor Pi.

Returning to the embodiment in FIG. 2, the computer (250) in which the model comprising the N modes is saved receives input measurands corresponding to the instantaneous value of the braking pressure (226), information (227) relating to the instantaneous speed of the vehicle or the braked device and the temperature (225) at one or more points of the linings (220). The model implemented in the form of a computer program in the computer (250) assigns these values after appropriate coding and conditioning routines to the corresponding driving factors, computes the monitored operating parameters, for example the temperature gradient in the thickness of the disk (210) with those values, and, depending on the result and pre-saved rules, drives the means (215) for pressurizing the hydraulic fluid, which has the effect of changing the pressure (226) and temperature (225). The computation of the monitored parameter is then updated etc. Thus, the device implementing the method according to the invention makes it possible to dynamically track the value of a parameter that is not directly measurable, in this case an output parameter representative of the temperature gradient in the thickness of the brake disk (210), in this embodiment. The calculation of the parameter is even faster when the number of modes is small, which allows the use of very simple scenarios for controlling the braking pressure, since the set point is updated very frequently.

As a non-limiting example, in this embodiment, the driving factors may be:
- the temperature (225) and its time derivative;
- the pressure (226) and its time derivative;
- the vehicle speed (227) and its time derivative;
- the diameter, the thickness of the brake disk (210)
- the characteristics of the disk material (210): density, elastic modulus, thermal diffusivity, thermal expansion coefficient
- the geometric characteristics of the linings (220)
- the characteristics of the lining materials
- the volume and the flow of hydraulic fluid
- the characteristics of the material of the hydraulic fluid: specific heat, viscosity, density, compressibility Some of these driving factors are updated by computation or by measurement during the working of the control device, for example, the temperature, pressure and speed; other driving factors are fixed for a given control device and make it possible to particularize the general solution for that particular device, e.g. the geometric characteristics of the elements involved or the properties of materials. Thus, if each factor Pi is discretized over NPi=10 points, the mesh comprises 75 nodes and 50 modes are taken into consideration, the complexity of the model, after the particularizing driving factors have been set, is approximately 50×(75+10×8), which, with a processor having a computation power of a few hundred megaflops, can be computed in less than 0.001 seconds for each output parameter considered.

Figure 4:
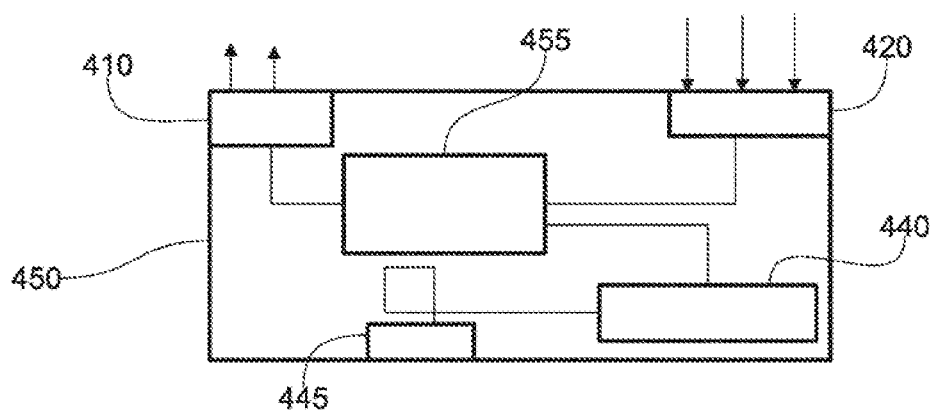
FIG. 4 is a schematic view of a device according to an embodiment of the device according to the invention.

In FIG. 4 of an exemplary implementation, the device (450) according to the invention comprises a processor (455) and memory means (440) capable of containing the parametric model of the controlled process or system. The device also comprises an input port (420) for receiving the values of the driving factors and an output port (410) for transmitting the parameters calculated by the processor (455) from the model read in the memory means (440). The model may be loaded into and unloaded from the memory means (440) via an interface (445). The device, which may be constituted by a microcomputer, further comprises all the elements known in the prior art that are required for operation. As the model can be loaded into and unloaded from the memory means (440), said model may comprise driving factors Pj with a value particularized for the controlled system or process. In the embodiment shown in FIG. 2, such driving factors Pj are for example, constituted by the characteristics relating to the geometry of the disk (210) and the linings (220) and the materials that make them up. Thus, a general parametric model can be computed for all similar types of systems or processes that have been particularized specifically for each system or process, by setting the values of the corresponding factors Pj. Returning to the example in FIG. 2, the general model can be built for any type of disk braking system and particularized for each type of vehicle based on the characteristics of its braking system.

Figure 5:
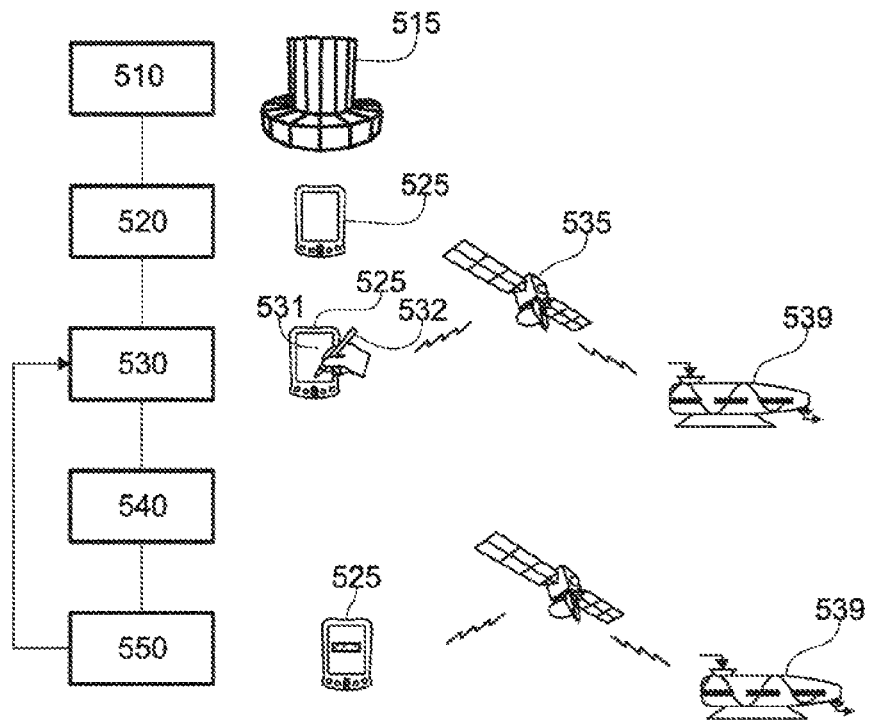
FIG. 5 is a chart for implementing the method according to the invention for the control of an industrial process.

Thus, in the exemplary embodiment in FIG. 5, the method according to the invention comprises a first preparatory step (510) consisting in identifying a representative parametric model of the system or process of interest, for example the process of interest may be a plastic extrusion method and system. This computation step may be carried out on a supercomputer (515) or with grid computing means to obtain sufficient computing power for such identification if necessary. During a second preparatory step (520), the model identified in that way is saved as a computer program in an independent device (525).

The remainder of the process is implemented on the independent device (525).

The level of the driving factors is acquired in an acquisition step (530). In one embodiment, the driving factors can be supplied in part by means of a pointing device (532) such as a stylus, on the touch screen (531) of the independent terminal (525); another part may be supplied via a remote connection (535), in the form of measurands from the control sensors of the industrial system (539) implementing the process.

In a computation step (540), the parameters of the model are computed and may be compared with target objectives.

During the following step (550), the result is displayed, for example on the screen of the independent device (525) and one or more driving factors may be modified on the industrial process (539) so as to be closer to target objectives.

Figure 6:
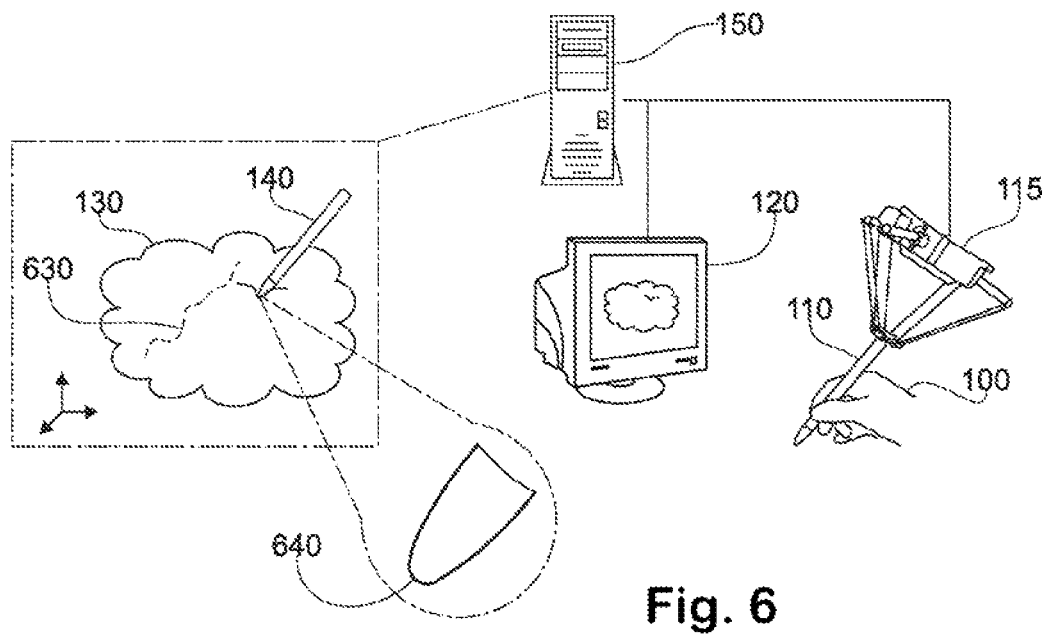
FIG. 6 is an embodiment of a haptic interface using a method and a device according to the invention for training a surgeon in a procedure in tissue with complex behavior.

In FIG. 6 of an exemplary embodiment of a haptic interface, the solid (130), the deformation of which is simulated, is an organ such as a liver, and the stylus (140) is a surgical instrument. One of the difficulties of such surgery lies in successfully cutting the liver parenchyma without cutting a blood vessel (630). From a practical point of view, the difference in resistance between the liver parenchyma and the vessel allows the surgeon to identify the presence of said blood vessel. Thus, such a haptic interface provides simulation in order to train the surgeon in the proper procedure in a variety of configurations. In this embodiment, the method according to the invention adapted to the haptic interface allows not just the accurate simulation of the behavior, but also the use of particularization driving factors such as shape-related factors (640) of the blade of the surgical instrument, the trajectory of the vessels (630) and/or the mechanical behavior of the liver parenchyma and blood vessels. To that end, the solid (130) can be discretized in a volume mesh, because the method according to the invention makes it possible to take account of any property variations in the volume, for example in the form of particularizing driving factors.

The above description and the embodiments show that the invention achieves the objectives sought; in particular the invention allows the simulation and dynamic control of complex processes and systems by bypassing the problem of the curse of dimensionality as it arises in the prior art. Most practical problems only require the consideration of a number of driving factors k below 10 and the consideration of a number of modes N less than 200. The embodiments set out above are purely illustrative and do not limit the applications of the invention to those cases alone. On the basis of these examples, those skilled in the art can adapt the method and the device according to the invention for other similarly complex applications.

The invention claimed is:

1. A method for a real-time control of a driving factor of a complex system or process, wherein a status of the complex system or process is governed by a plurality of driving factors, Pi (i=1 . . . k), varying in discretized domains where NPi is a plurality of discretization points of each driving factor Pi over its domain, comprising the steps of:
- obtaining a parametric model of a simulation in a form of a functional equation connecting a response to variations in the plurality of driving factors for any combination of values of the driving factors in their range of variation in a form of a sum of N modes, involving k functions of the driving factors, where each mode is defined for each of the NPi discretized values, the parametric model is identified offline by successive supplementations by invoking a weak formulation of a problem, on a super-computer, in a form of a computer program and storing the computer program in an independent device comprising:
  - a memory to store the parametric model comprising N modes defined in all the NPi discretized values of the plurality of the driving factors;
  - a processor configured to implement computations relating to the parametric model;
  - an output port configured to supply proportional numeric information at an output during the implementation of the parametric model by the processor;
- obtaining instantaneous values of the plurality of driving factors of the system or process;
- executing the computer program representing the parametric model on the independent device and determining a value of a response parameter depending on the instantaneous values of the driving factors;
- modifying the status of the system or process by modifying the value of a driving factor on the basis of the value of the computed response parameter.

2. The method according to claim 1, further comprising the step of obtaining the parametric model by a proper generalized decomposition (PGD) method.

3. The method according to claim 1, wherein N is greater than or equal to 10, each $NP_i$ is greater than or equal to 10 and k is greater than or equal to 80.

4. The method according to claim 1, wherein N ranges between 10 and 200.

5. The method according to claim 1, wherein the value of a driving factor Pj is indeterminate; and wherein the step of obtaining the parametric model further comprises the steps of:
- building the parametric model integrating the driving factor Pj for a variation range discretized into NPj values; and
- readjusting the parametric model for an effective value of the factor Pj.

6. The method according to claim 1, one of the driving factors is a measurand with a value determined by a sensor.

7. The method according to claim 6, wherein an output parameter is a non-measurable status variable of the complex system or process.

8. The method according to claim 6, wherein an output parameter is representative of a gradient.

* * * * *